United States Patent [19]

Watkins et al.

[11] Patent Number: 4,498,538

[45] Date of Patent: Feb. 12, 1985

[54] METHOD FOR MAINTAINING THE PERMEABILITY OF FINES-CONTAINING FORMATIONS

[75] Inventors: David R. Watkins, Irvine; Leonard J. Kalfayan, Pasadena, both of Calif.

[73] Assignee: Union Oil Company of California, Los Angeles, Calif.

[21] Appl. No.: 506,537

[22] Filed: Jun. 21, 1983

[51] Int. Cl.$^3$ ............................................. E21B 43/22
[52] U.S. Cl. .................................................... 166/295
[58] Field of Search ........................ 166/276, 295, 300

[56] References Cited

U.S. PATENT DOCUMENTS

| | | |
|---|---|---|
| 2,633,919 | 4/1953 | Bauer et al. |
| 2,761,512 | 9/1956 | Bond |
| 3,036,630 | 5/1962 | Bernard et al. |
| 3,282,338 | 11/1966 | Walther et al. ...................... 166/295 |
| 3,285,339 | 11/1966 | Walther et al. ...................... 166/295 |
| 3,286,770 | 11/1966 | Knox et al. |
| 3,310,111 | 3/1967 | Pavlich et al. |
| 3,625,287 | 12/1971 | Young ................................ 166/295 |
| 3,845,823 | 11/1974 | Allen |
| 4,018,285 | 4/1977 | Watkins et al. ...................... 166/295 |
| 4,042,032 | 8/1977 | Anderson et al. .................... 166/276 |
| 4,073,342 | 2/1978 | Harnsberger |
| 4,073,343 | 2/1978 | Harnsberger |

FOREIGN PATENT DOCUMENTS

| | | | |
|---|---|---|---|
| 869842 | 5/1971 | Canada ............................... | 166/295 |
| 912987 | 10/1972 | Canada | |
| 2652045 | 11/1976 | Fed. Rep. of Germany ...... | 166/295 |
| 7507743 | 4/1965 | Netherlands ....................... | 166/295 |
| 1511589 | 10/1976 | United Kingdom ............... | 166/295 |

*Primary Examiner*—Stephen J. Novosad
*Assistant Examiner*—William P. Neuder
*Attorney, Agent, or Firm*—Dean Sandford; Gregory F. Wirzbicki; Gerald L. Floyd

[57] ABSTRACT

A method for treating formations which contain particulate fines to decrease movement of or swelling of the fines when a fluid passes through the formation, thus maintaining the permeability of the formation, comprising injecting into the formation an organosilane or an ester of an organosilane, preferably in a hydrocarbon carrier liquid.

37 Claims, No Drawings

METHOD FOR MAINTAINING THE PERMEABILITY OF FINES-CONTAINING FORMATIONS

BACKGROUND OF THE INVENTION

1. Field of the Invention

This invention relates to a method for treating a subterranean, fines-containing formation penetrated by a well to improve, maintain and preserve the permeability of the formation. More particularly, the invention relates to such a method wherein movement of the fines and swelling of water-sensitive fines is minimized.

2. Description of the Prior Art

In producing or recovering fluids from subterranean formations containing fines, such as silt-sized or smaller particles, it is often the experience that these very fine particles are subject to movement by the fluid even when the fluid is flowing at a relatively low rate. Where a large volume of fluid is forced to flow through such a silty or dirty formation, the very fine particles tend to be carried along until they become lodged in a pore throat, e.g., the smaller interstices between the grains of the formation. This at least partially plugs the openings and reduces the permeability of the formation. A permeability impairment due to the movement of such particles is often a major problem in the operation of fluid injection wells and fluid production wells. Also, certain types of water-sensitive clay fines which can be present in the formation, for example montmorillonite, can swell and decrease the permeability of the formation if the fluid passing therethrough is or contains water.

Various treatments have been proposed to minimize damage to formation permeability by fine particles. Such treatments have included the injection of zirconium oxychloride to stablize clays, converting clays from the swelling sodium or lithium form to another cation form which does not swell as much, and injection of various amines or hydroxyaluminum solutions.

Further, it is known to inject particular organosilanes into subterranean formations as a component of various treating agents for various purposes. Thus, U.S. Pat. No. 3,286,770 to Knox et al. teaches a method for rendering formations preferentially oil-wettable so as to increase the flow rate of water therethrough. The method involves injecting into the formation a treating agent comprising certain organohalogensilanes in a water-soluble solvent. The organohalogensilane reacts with silica surfaces or sand in the formation to form a polymer and render the formation oil-wettable.

U.S. Pat. No. 2,633,919 to Bauer et al. describes a method for increasing oil production from a well wherein the formation is first dried as by heating or injection of a solvent wash such as alcohol. Next there is injected into the formation a silicone-forming agent, for example, a mono-, di-, or trialkyl, or -aryl silicon halide, or corresponding ester thereof, to form a solid silicone polymer which is bonded to the surface of the formation.

While these and other treatments have met with some success in particular applications, the need exists for a further improved well treating process to minimize the reduction in permeability that can occur when a fluid passes through a formation which contains moveable and/or swellable finely divided particles.

Accordingly, a principal object of this invention is to provide a method for reducing the permeability damage to fines-containing subterranean formations due to passage of a fluid therethrough.

It is another object to provide a method of inhibiting permeability impairment due to the movement or swelling of very fine particles within a porous formation.

It is still another object to provide a method for stabilizing fines-containing formations.

It is a further object to coat the fines of a fines-containing formation to bind them in position and minimize contact between the fines and fluids subsequently passed through the formation.

It is a still further object to provide such a method without first drying the formation to remove water from the area to be treated.

It is a still further object to provide such a method without injecting water into the formation at the conclusion of the treatment.

Other objects, advantages and features of this invention will become apparent to those skilled in the art from the following description and appended claims.

SUMMARY OF THE INVENTION

Briefly, the invention provides a method for treating formations which contain particulate fines which swell if contacted by an aqueous liquid and/or are free to move through the formation, whereby the swelling and/or movement of the fines is reduced so as to maintain a relatively high permeability through the formation, which method involves injecting an organosilane or ester thereof into the formation, usually in an amount of about 0.5 to 100 gallons per vertical foot of formation to be treated. Typically, the organosilane has the formula:

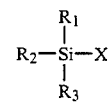

wherein X is a halogen, $R_1$ is an organic radical having from 1 to 50 carbon atoms, and $R_2$ and $R_3$ are the same or different halogens or organic radicals having from 1 to 50 carbon atoms. The typical ester of an organosilane for use in this invention has the formula:

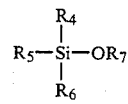

wherein $R_4$, $R_5$ and $R_6$ are independently selected from hydrogen and organic radicals having from 1 to 50 carbon atoms, provided not all of $R_4$, $R_5$, and $R_6$ are hydrogen, and $R_7$ is an organic radical having from 1 to 50 carbon atoms.

Preferably, the organosilane or organosilane ester is injected as a solution in a hydrocarbon carrier liquid and/or with a polymerization catalyst selected from the group consisting of an organic or inorganic acid or acid precursor and an organic or inorganic base or base precursor. The organosilane or organosilane ester reacts with siliceous surfaces in the formation, coats the fines, binds them in place and restricts their subsequent movement.

DETAILED DESCRIPTION OF THE INVENTION

Most subterranean formations, regardless of their composition, contain at least some fines or detrital material which are not held in place by the natural cementatious material that binds the larger formation particles, but instead are loose in the formation or become dislodged from the formation when fluid is passed through the formation, as during production of formation fluids via a well penetrating the formation or injection of fluids into the formation via a well. The loose fines tend to become dispersed in the fluids passing through the formation and migrate along with the fluid. They are carried along and are either carried all the way through the formation and can be produced out of the formation if the fluid is flowing to a well, or they can become lodged in the formation in constrictions or pore throats and reduce formation permeability. In addition, if the fines are clays which swell in the presence of water and the fluid passing through the formation is or contains water, permeability reduction can occur due to swelled clay particles occupying a greater proportion of the formation pore volume. The method of this invention coats these fines and binds them in place, thereby decreasing their swelling and reducing their freedom to migrate through the formation. Thus, the permeability of the formation is maintained and preserved, and impairment of the permeability by fluids subsequently passed through the formation is minimized.

Formation fines can be incorporated into the formation as it is deposited over geologic time, or can be introduced into the formation during drilling and completion operations. Fines are present to some extent in most sandstones, shales, limestones, dolomites and the like. Problems associated with the presence of fines are often most pronounced in sandstone-containing formations.

"Formation fines" are defined as particles small enough to pass through the smallest mesh screen commonly available (400 U.S. Mesh, or 37 micron openings). The composition of the fines can be widely varied as there are many different materials present in subterranean formations. Broadly, fines may be classified as being quartz, other minerals such as feldspars, muscovite, calcite, dolomite and barite; water-swellable clays such as montmorillomite, beidellite, nontronite, saponite, hectorite and sauconite, with montmorillonite being the clay material most commonly encountered; non-water-swellable clays such as kaolinite and illite; and amorphous materials.

Among the organosilanes suitable for use in this invention are those having the formula:

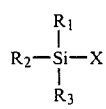

wherein X is a halogen, $R_1$ is an organic radical having from 1 to 50 carbon atoms, and $R_2$ and $R_3$ are the same or different halogens or organic radicals having from 1 to 50 carbon atoms. Preferably, X is a halogen selected from the group consisting of chlorine, bromine and iodine with chlorine being preferred, $R_1$ is an alkyl, alkenyl or aryl group having from 1 to 18 carbon atoms and $R_2$ and $R_3$ are the same or different halogens, or alkyl, alkenyl or aryl group having from 1 to 18 carbon atoms.

Suitable specific organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

Among the esters of the organosilanes suitable for use in this invention are those having the formula:

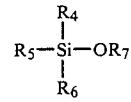

wherein $R_4$, $R_5$ and $R_6$ are independently selected from hydrogen and organic radicals having from 1 to 50 carbon atoms, provided not all of $R_4$, $R_5$ and $R_6$ are hydrogen, and $R_7$ is an organic radical having from 1 to 50 carbon atoms. Preferably, $R_4$, $R_5$ and $R_6$ are independently selected from hydrogen, amine, alkyl, alkenyl, aryl and carbhydryloxy group having from 1 to 18 carbon atoms, with at least one of the $R_4$, $R_5$ and $R_6$ groups not being hydrogen, and $R_7$ is selected from an amine, alkyl, alkenyl and aryl group having from 1 to 18 carbon atoms. When $R_4$, $R_5$ and/or $R_6$ are carbhydryloxy groups, alkoxy groups are preferred.

Suitable esters of organisilanes include divinyldimethoxysilane, divinyldi-β-methoxyethoxy silane, di(γ-glycidoxy propyl) dimethoxysilane, vinyltriethoxysilane, vinyltris-β-methoxyethoxysilane, γ-glycidoxypropyltrimethoxysilane, γ-methacryloxypropyltrimethoxysilane, β-(3,4-epoxycyclohexyl) ethyltrimethoxysilane, N-β-aminoethyl-γ-propylmethyldimethoxysilane, N-β-aminoethyl-γ-propyltrimethoxysilane, N-β-aminoethyl-γ-aminopropyltrimethoxysilane, γ-aminopropyltriethoxysilane, N-(β-aminoethyl)-γ-aminopropyltrimethoxysilane and the like.

Preferred esters of organosilanes include the amine-containing silanes. The presence of the amine function appears to result in a stronger adsorption of the silane on the formation rock. The resultant polymer renders the treated portion of the formation less oil wet than when a non-amine-containing silane is employed. Thus, in subsequent production of oil through the formation, less oil is retained by the formation and more of the oil is produced. In addition, it appears that polymers formed from amine-containing silanes may be more stable at higher temperatures. Hence, amine-containing silanes may be more useful in higher temperature formations or in formations into which a high temperature fluid is subsequently injected.

The amount of organosilane or organosilane ester which can be used varies widely depending on such factors as the particular organosilane or organosilane ester employed, the nature, permeability, temperature and other characteristics of the subterranean formation and the like. Generally, the organosilane or organosilane ester is employed in an amount sufficient to maintain the rate of flow of liquid through the formation at a relatively constant rate following a treatment. Often, this is an amount sufficient to coat a substantial portion of the formation fines. Typically, about 0.5 to 100 gallons per vertical foot of formation to be treated of the organosilane or organosilane ester is employed.

The organosilanes or organosilane esters, hereinafter referred to as "silane material," can be injected either with or without a hydrocarbon carrier liquid. It is preferred to utilize a hydrocarbon carrier liquid since, with carrier-containing solutions, there is less opportunity for the silane material to contact water and at least partially react during its passage down the well conduit and through the formation in the immediate vicinity of the wellbore. The silane material either alone or mixed with a hydrocarbon carrier liquid passes readily through a permeable formation. However, reacted silane material tends to plate out on the face of the formation and penetrates the formation only to a limited extent. Suitable hydrocarbon carrier liquids include crude oil, an aliphatic hydrocarbon such as hexane, an aromatic hydrocarbon such as benzene, toluene or a petroleum distillation product or fraction such as kerosene, naphthas or diesel fuel. Preferably solutions of about 0.2 to 50 percent by volume silane material in hydrocarbon carrier is employed.

While the reaction of the silane material with materials in the formation is not completely understood, and while the invention is not to be held to any theory of operation, it is believed that the silane material condenses on and reacts with active sites on siliceous surfaces with which it comes in contact to form a polymer. It is believed that the silane monomer first hydrolyzes and forms a reactive intermediate and either the acid or alcohol depending on the type of monomer:

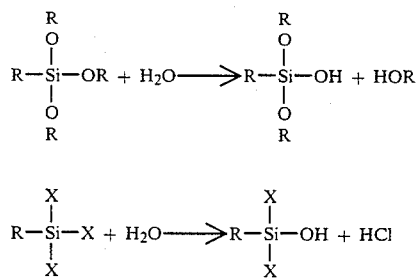

The reactive intermediates, "silanols," then condense to begin formation of the polymer.

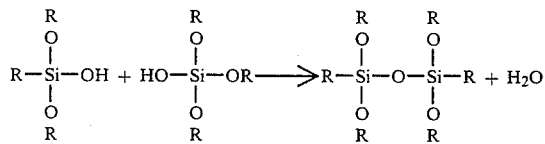

The growth of the polymer can proceed as hydrolysis and condensation continue.

The silanol can also react with active sites on the rock to covalently bind the polymer to it:

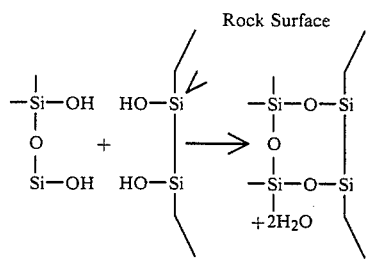

The polymer becomes covalently bonded to any siliceous surface, including clays and the quartz grains which define the pore structure in sandstones or poorly consolidated or unconsolidated formations containing siliceous materials. The polymer acts as a glue to bind formation fines in place, thus reducing their movement when a fluid flows through the formation. The polymer also coats any water-swellable clays and thereby reduces their subsequent swelling by water-containing fluids.

The rate of reaction of the injected silane material with the siliceous materials in the formation depends on various factors such as the organic substituents of the silane material, the concentration of silane material in the injected solution, the particular hydrocarbon carrier, if used, and the formation temperature. While the reaction of the silane material with the siliceous material occurs in the absence of a polymerization catalyst, it is optional to speed up the rate of reaction, either by including a polymerization catalyst in the silane material-containing solution or by injecting a preflush of a slug of hydrocarbon carrier containing a polymerization catalyst prior to the injection of the silane material-containing solution. Suitable catalyst for polymerizing silane material are well known in the art and can be either an acidic or an alkaline material. Examples of acidic catalysts include (1) organic or inorganic acids or acid-forming materials such as acetic acid, ethyl acetate, formic acid, ethyl formate, hydrochloric acid, sulfuric acid and hydroiodic acid, and (2) organic or inorganic bases or base-forming materials such as sodium hydroxide, butylamine, piperidine, phosphines and alkali metal amides. If at least some catalyst is used, no more than about 50 percent by volume of catalyst, based on the volume of the injected solution, should be employed. In this instance the term "injected solution" is defined as a hydrocarbon carrier liquid preflush, a silane or a solution of a silane and a hydrocarbon carrier. Preferably, no more than about 10 percent by volume of catalyst, based on the volume of injected solution, should be employed.

Before injecting the silane material-containing solution, it is optionally preferred to backflow the formation, i.e., inject a slug of a preflush composition. The preflush dislodges any bridges of fines that might have been formed at pore throats during production of fluids from the formation. This increases the probability that subsequently-injected silane material will bind the fines in position at a location in the formation somewhere other than at a pore throat, thus increasing the permeability of the formation compared to what it was before the treatment. The materials which can be used as a preflush are the same hydrocarbon carrier liquids described above which are sometimes injected along with the silane material. As mentioned above, the preflush can also contain a catalyst for polymerizing silane material. The volume of preflush to be used is typically about 0.5 to 100 gallons per vertical foot of formation to be treated.

In selecting a preflush material, it is preferred to avoid a mutual solvent, i.e., a material such as a lower alkyl alcohol in which the silane, the hydrocarbon carrier liquid and water each have at least some solubility. When a mutual solvent is injected into a water-containing formation as a preflush, the formation retains at least some of the resulting solution of water in the mutual solvent. If a solution of silane in a hydrocarbon carrier liquid is injected into this formation, some of the solution of water in the material solvent dissolves in the solution of silane in the hydrocarbon carrier. As a result, water can contact the silane and hydrolyze the silane to form a polymer before the silane has adsorbed on the formation rock. This polymer does not absorb on the formation and does not bind formation fines in place.

Similarly, following injection of the silane material-containing solution, it is optionally preferred to inject a slug of an afterflush or overflush material to displace the silane material-containing solution out of the wellbore and into the formation. The same hydrocarbon carrier liquids described above or any convenient aqueous or nonaqueous fluid, liquid or gaseous, can be used as the afterflush. The volume of liquid afterflush to be used is typically about 0.5 to 100 gallons per vertical foot of formation to be treated. While an aqueous displacement fluid can be used, it is preferred that no portion of the aqueous displacement fluid be injected into the silane-treated formation. Most hydrocarbon-producing formations contain sufficient connate water to hydrolyze the silane after the silane has adsorbed onto the formation rock and require no additional water for hydrolysis. If water is injected into a formation containing both a silane and liquid formation hydrocarbons or a hydrocarbon carrier liquid, there is danger that the injected water will contact and hydrolyze the silane at the water-hydrocarbon interface such that the hydrocarbon layer will be a barrier to reaction of the silanol and condensation products with the rock surface. Also, it is often desired that no water be injected into those formations which produce only oil and contain no water other than connate water.

The invention is further illustrated by the following examples which are illustrative of various aspects of the invention and are not intended as limiting the scope of the invention as defined by the appended claims.

EXAMPLES 1 to 3

The producing formation of an Alaskan well is known to contain mobile clay, feldspar and quartz fines. A 2-inch long, 15/16 inch diameter first Alaskan core from this well is placed in a stainless steel sleeve adapted to allow fluids to be flowed through the core. An aqueous solution containing 3 percent by weight potassium chloride is continuously flowed through the core at ambient temperature and 150 psig and the flow rate determined. A summary of the results of this test is reported in Table 1. These results show that the flow rate declines steadily. It is believed this decline is the result of permeability loss to the migration of clay, feldspar and quartz fines within the core.

TABLE 1

| Time (minutes) | Pressure Differential (psig) | Flow Rate (milliliters/minute) |
|---|---|---|
| 0 | 15.0 | 4.4 |
| 35 | " | 4.0 |
| 90 | " | 3.5 |
| 105 | " | 3.4 |
| 150 | " | 3.2 |
| 190 | " | 3.1 |
| 240 | " | 3.0 |
| 265 | " | 2.9 |
| 300 | " | 2.8 |

A second 2-inch long, 15/16 inch diameter Alaskan core is mounted in a stainless steel sleeve. A 3 percent by weight aqueous solution of potassium chloride is flowed through the core at a rate of 5.4 milliliters/minute. An initial unstable permeability of 140.3 millidarcys (mds.) is established. With continued flow of fluid through the core, the permeability declines, finally leveling off at 84.8 mds. at a flow rate of 5.0 milliliters/minute. This indicates the occurrence of migration of fines within the core. Next, the core is backflushed with the aqueous solution of potassium chloride at a high rate of 17 milliliters/minute. The permeability in the original flow direction increases to 118.1 mds. which is 84.2 percent of the original unstable permeability.

The core is then treated according to the instant invention by injecting into the core in the original flow direction at 150° F., 100 milliliters of a solution containing 3 percent by volume methyltriethoxysilane, 2 percent by volume acetic acid catalyst and 95 percent by volume xylene carrier at a flow rate of 2 milliliters/minute. The permeability to the aqueous potassium chloride solution is then determined at different flow rates. At a flow rate of 5.3 milliliters/minute, the permeability is 94.6 mds. At a flow rate of 7.2 milliliters/minute, the permeability is 93.6 mds. At a flow rate of 13.9 milliliters/minute, the premeability is 86.8 mds. At each flow rate the original permeability holds steadily with continued fluid flow and does not decrease. This indicates there is negligible movement of fines in the formation.

A third 2-inch long, 15/16 diameter Alaskan core is mounted in a stainless steel sleeve. The core is treated according to the instant invention by injecting therein at 150° F., 100 milliliters of a solution containing 3 percent by volume γ-aminopropyl triethoxysilane, 2 percent by volume butyl amine catalyst and 95 percent by volume xylene carrier at a flow rate of 2 milliliters per minute. Next there is flowed through core in the same direction while measuring the flow rate (1) first an aqueous solution containing 3 percent by weight sodium chloride for 120 minutes, and (2) next distilled water for 160 minutes. The results of this test are reported in Table 2. These results show that the initial flow rate with each fluid is stable, i.e., does not decline with continued passage of fluid through the core. The indicates no measurable movement of fines within the core.

TABLE 2

| Injected Material | Time (Minutes) | Pressure Differential (psig) | Flow Rate (milliliters/minute) |
|---|---|---|---|
| salt solution* | 0 | 20 | 10.0 |
| " | 30 | " | 10.1 |
| " | 60 | " | " |
| " | 75 | " | " |
| " | 90 | " | " |
| " | 120 | " | " |
| distilled water | 0 | " | " |
| " | 30 | " | 10.0 |
| " | 90 | " | 10.2 |
| " | 120 | " | " |
| " | 155 | " | " |
| " | 160 | " | " |

*Salt solution is an aqueous solution containing 3 percent by weight sodium chloride.

EXAMPLE 4

A California well is completed in an oil-bearing formation whose wells have a history of declining in production rate with time. From an initial production rate following completion of 50 barrels per day oil and 10 barrels per day water, production declines after 1 year to 5 barrels per day oil and 5 barrels per day water. A core from this well is examined in the laboratory and found to be sensitive to damage by movement of formation fines, i.e., suffers a decrease in fluid permeability. The core also contains water-swellable clays.

The well is given a treatment to bind the formation fines in place. First there is injected 3,000 gallons of a commercially available aromatic solvent as a preflush. Next, there is injected 3,000 gallons of a solution containing 95 percent by volume aromatic solvent as a carrier liquid, 3 percent by volume of γ-aminopropyl triethoxysilane and 2 percent by volume of ethyl formate polymerization catalyst. Finally, there is injected 3,000 gallons of aromatic solvent afterflush. Injection is carried out for about 7 hours at rates varying between 0.5 and 1.0 barrels per minute at a wellhead pressure of 600 to 800 psig.

At the completion of the treatment, the well is returned to production. Initially, production increased to approximately two thirds the same as that following completion of the well. This high production rate continues for several months without declining appreciably.

While various specific embodiments and modifications of this invention have been described in the foregoing specifications, further modifications will be apparent to those skilled in the art. Such further modifications are included within the scope of this invention as defined by the following claims.

We claim:

1. A method for treating subterranean formations which contain formation fines to minimize impairment of formation permeability due to the presence of formation fines comprising, without drying the said formation, injecting into the said formation in an amount sufficient to maintain the rate of flow of a liquid through the formation at a relatively constant rate a composition consisting essentially of an organosilane having the formula:

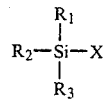

wherein X is a halogen, $R_1$ is an organic radical having from 1 to 50 carbon atoms, $R_2$ and $R_3$ are the same or different halogens or organic radicals having from 1 to 50 carbon atoms; or an ester of an organosilane having the formula:

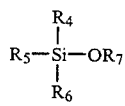

wherein $R_4$, $R_5$ and $R_6$ are independently selected from hydrogen and organic radicals having from 1 to 50 carbon atoms and $R_7$ is an organic radical having from 1 to 50 carbon atoms.

2. The method defined in claim 1 wherein the organosilane or ester of an organosilane is injected in an amount sufficient to coat a substantial portion of the formation fines.

3. A method for treating subterranean formations which contain formation fines to minimize impairment of formation permeability due to the presence of the formation fines comprising, without drying the said formation, injecting into the said formation in an amount sufficient to maintain the rate of flow of a liquid through the formation at a relatively constant rate a composition consisting essentially of an organosilane having the formula:

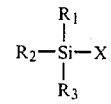

wherein X is a halogen selected from the group consisting of chlorine, bromine and iodine, $R_1$ is an alkyl, alkenyl or aryl group having from 1 to 18 carbon atoms and $R_2$ and $R_3$ are the same or different halogens, or alkyl, alkenyl or aryl group having from 1 to 18 carbon atoms; or an ester of an organosilane having the formula:

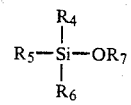

wherein $R_4$, $R_5$ and $R_6$ are independently selected from hydrogen, amine, alkyl, alkenyl, aryl and carbhydroyloxy groups having from 1 to 18 carbon atoms, with at least one of the $R_4$, $R_5$ and $R_6$ groups not being hydrogen, and $R_7$ is selected from an amine, alkyl, alkenyl and aryl group having from 1 to 18 carbon atoms.

4. The method defined in claim 3 wherein the organosilane or ester of an organosilane is injected in an amount sufficient to coat a substantial portion of the formation fines.

5. The method defined in claim 3 wherein the amount of organosilane or ester of an organosilane employed is about 0.5 to 100 gallons per vertical foot of formation to be treated.

6. The method defined in claim 3 wherein the organosilane or ester of an organosilane is injected as a solution up to about 50 percent by volume in a hydrocarbon carrier liquid.

7. The method defined in claim 6 wherein the hydrocarbon carrier is selected from the group consisting of crude oil, an aliphatic hydrocarbon, an aromatic hydrocarbon and a petroleum distillation product.

8. The method defined in claim 3 wherein there is included in the organosilane or ester of an organosilane injected up to about 50 percent by volume of a polymerization catalyst.

9. The method defined in claim 3 wherein there is injected into the formation before the organosilane or ester of an organosilane about 0.5 to 100 gallons per vertical foot of formation to be treated of a preflush of a hydrocarbon liquid.

10. The method defined in claim 9 wherein there is included in the preflush of a hydrocarbon liquid up to about 50 percent by volume of a polymerization catalyst.

11. The method defined in claim 3 wherein there is injected into the formation following the organosilane or ester of an organosilane about 0.5 to 100 gallons per vertical foot of formation to be treated of an afterflush of a hydrocarbon liquid.

12. The method defined in claim 3 wherein the ester of an organosilane is an alkylated amine substituted ester of an organosilane.

13. The method defined in claim 3 wherein the ester of an organosilane is γ-aminopropyltriethoxysilane.

14. A method for treating a subterranean formation which contains formation fines, to minimize impairment of formation permeability due to the presence of the formation fines, comprising, without drying said formation:
(a) injecting into said formation in an amount sufficient to maintain the rate of flow of a liquid through the formation at a relatively constant rate a composition consisting essentially of an organosilane having the formula:

$$\begin{array}{c} R_1 \\ | \\ R_2-Si-X \\ | \\ R_3 \end{array}$$

wherein X is a halogen, $R_1$ is an organic radical having from 1 to 50 carbon atoms, and $R_2$ and $R_3$ are the same or different halogens or organic radicals having from 1 to 50 carbon atoms; or an ester of an organosilane having the formula:

$$\begin{array}{c} R_4 \\ | \\ R_5-Si-OR_7 \\ | \\ R_6 \end{array}$$

wherein $R_4$, $R_5$ and $R_6$ are independently selected from hydrogen and organic radicals having from 1 to 50 carbon atoms and $R_7$ is an organic radical having from 1 to 50 carbon atoms; and
(b) placing the well in service without first injecting water into the formation.

15. The method defined in claim 14 wherein the organosilane or ester of an organosilane is injected in an amount sufficient to coat a substantial portion of the formation fines.

16. A method for treating a subterranean formation which contains formation fines, to minimize impairment of formation permeability due to the presence of the formation fines, comprising, without drying said formation;
(a) injecting into said formation in an amount sufficient to maintain the rate of flow of a fluid through the formation at a relatively constant rate a composition consisting essentially of an organosilane having the formula:

$$\begin{array}{c} R_1 \\ | \\ R_2-Si-X \\ | \\ R_3 \end{array}$$

wherein X is a halogen selected from the group consisting of chlorine, bromine and iodine, $R_1$ is an alkyl, alkenyl or aryl group having from 1 to 18 carbon atoms and $R_2$ and $R_3$ are the same or different halogens, or alkyl, alkenyl or aryl group having from 1 to 18 carbon atoms; or an ester of an organosilane having the formula:

$$\begin{array}{c} R_4 \\ | \\ R_5-Si-OR_7 \\ | \\ R_6 \end{array}$$

wherein $R_4$, $R_5$ and $R_6$ are independently selected from hydrogen, amine, alkyl, alkenyl, aryl and carbhydryloxy groups having from 1 to 18 carbon atoms, with at least one of the $R_4$, $R_5$ and $R_6$ groups not being hydrogen, and $R_7$ is selected from an amine, alkyl, alkenyl and aryl group having from 1 to 18 carbon atoms; and
(b) placing the well in service without first injecting water into the formation.

17. The method defined in claim 16 wherein the organosilane or ester of an organosilane is injected in an amount sufficient to coat a substantial portion of the formation fines.

18. The method defined in claim 16 wherein the amount of organosilane or ester of an organosilane employed is about 0.5 to 100 gallons per vertical foot of formation to be treated.

19. The method defined in claim 16 wherein the organosilane or ester of an organosilane is injected as a solution up to about 50 percent by volume in a hydrocarbon carrier liquid.

20. The method defined in claim 19 wherein there hydrocarbon carrier is selected from the group consisting of crude oil, an aliphatic hydrocarbon, an aromatic hydrocarbon and a petroleum distillation product.

21. The method defined in claim 16 wherein there is included in the organosilane or ester of an organosilane injected up to about 50 percent by volume of a polymerization catalyst.

22. The method defined in claim 16 wherein there is injected into the formation before the organosilane or ester of an organosilane about 0.5 to 100 gallons per vertical foot of formation to be treated of a preflush of a hydrocarbon liquid.

23. The method defined in claim 22 wherein there is included in the preflush of a hydrocarbon liquid up to about 50 percent by volume of a polymerization catalyst.

24. The method defined in claim 16 wherein there is injected into the formation following the organosilane or ester of an organosilane about 0.5 to 100 gallons per vertical foot of formation to be treated of an afterflush of a hydrocarbon liquid.

25. The method defined in claim 16 wherein the ester of an organosilane is an alkylated amine substituted ester of an organosilane.

26. The method defined in claim 16 wherein the ester of an organosilane is γ-aminopropyltriethoxysilane.

27. A method for treating a subterranean formation which contains formation fines, to minimize impairment of formation permeability due to the presence of the formation fines, comprising, without drying said formation, injecting into said formation in an amount sufficient to maintain the rate of flow of a fluid through the formation at a relatively constant rate a composition consisting essentially of an ester of an organosilane having the formula:

$$\begin{array}{c} R_4 \\ | \\ R_5-Si-OR_7 \\ | \\ R_6 \end{array}$$

wherein $R_4$, $R_5$ and $R_6$ are independently selected from hydrogen, amine, alkyl, alkenyl, aryl and carbhydryloxy groups having from 1 to 18 carbon atoms, with at least one of the $R_4$, $R_5$ and $R_6$ groups not being hydrogen, and $R_7$ is selected from an amine, alkyl, alkenyl and aryl group having from 1 to 18 carbon atoms.

28. The method defined in claim 27 wherein the organosilane or ester of an organosilane is injected in an amount sufficient to coat a substantial portion of the formation fines.

29. The method defined in claim 27 wherein the amount of organosilane or ester of an organosilane employed is about 0.5 to 100 gallons per vertical foot of formation to be treated.

30. The method defined in claim 27 wherein the organosilane or ester of an organosilane is injected as a solution up to about 50 percent by volume in a hydrocarbon carrier liquid.

31. The method defined in claim 30 wherein the hydrocarbon carrier is selected from the group consisting of crude oil, an aliphatic hydrocarbon, an aromatic hydrocarbon and a petroleum distillation product.

32. The method defined in claim 27 wherein there is included in the organosilane or ester of an organosilane injected up to about 50 percent by volume of a polymerization catalyst.

33. The method defined in claim 27 wherein there is injected into the formation before the organosilane or ester of an organosilane about 0.5 to 100 gallons per vertical foot of formation to be treated of a preflush of a hydrocarbon liquid.

34. The method defined in claim 33 wherein there is included in the preflush of a hydrocarbon liquid up to about 50 percent by volume of a polymerization catalyst.

35. The method defined in claim 27 wherein there is injected into the formation following the organosilane or ester of an organosilane about 0.5 to 100 gallons per vertical foot of formation to be treated of an afterflush of a hydrocarbon liquid.

36. The method defined in claim 27 wherein the ester of an organosilane is an alkylated amine substituted ester of an organosilane.

37. A method for treating a subterranean formation which contains formation fines, to minimize impairment of formation permeability due to the the presence of the formation fines, comprising, without drying said formation, injecting into said formation about 0.5 to 100 gallons per vertical foot of formation to be treated a composition consisting essentially of $\gamma$-aminopropyltriethoxysilane.

* * * * *

UNITED STATES PATENT AND TRADEMARK OFFICE
CERTIFICATE OF CORRECTION

PATENT NO. : 4,498,538
DATED : February 12, 1985
INVENTOR(S) : David R. Watkins, et al It is certified that error appears in the above-identified patent and that said Letters Patent is hereby corrected as shown below:

The term of this patent subsequent to October 30, 2001, has been disclaimed.

Signed and Sealed this

Tenth Day of September 1985

[SEAL]

Attest:

DONALD J. QUIGG

Attesting Officer    Acting Commissioner of Patents and Trademarks - Designate